N. JOSIAS.
COMBINATION SAW TABLE AND SINGLE SPINDLE SHAPER.
APPLICATION FILED SEPT. 6, 1919.
1,327,390.
Patented Jan. 6, 1920.
4 SHEETS—SHEET 1.
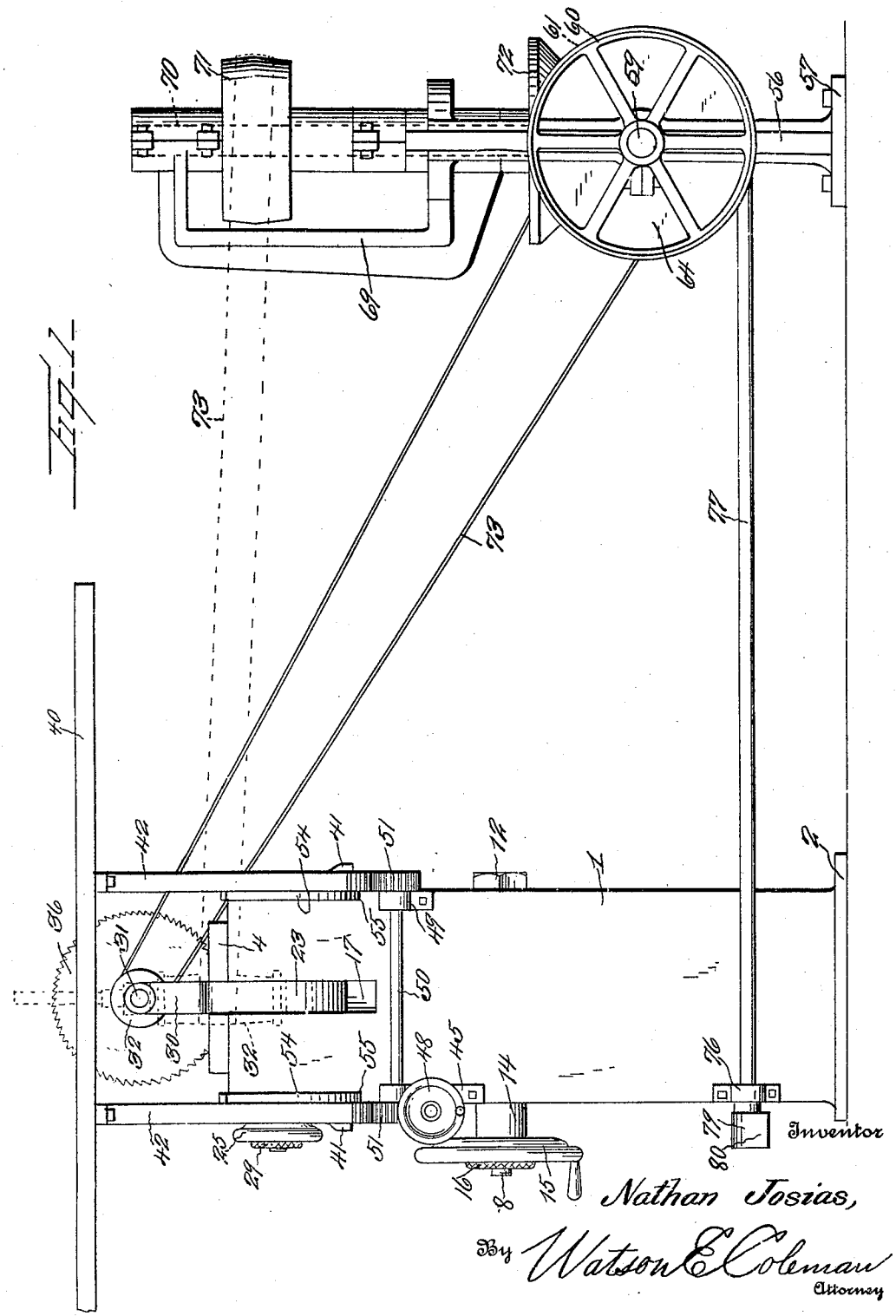

N. JOSIAS.
COMBINATION SAW TABLE AND SINGLE SPINDLE SHAPER.
APPLICATION FILED SEPT. 6, 1919.
1,327,390.
Patented Jan. 6, 1920.
4 SHEETS—SHEET 2.
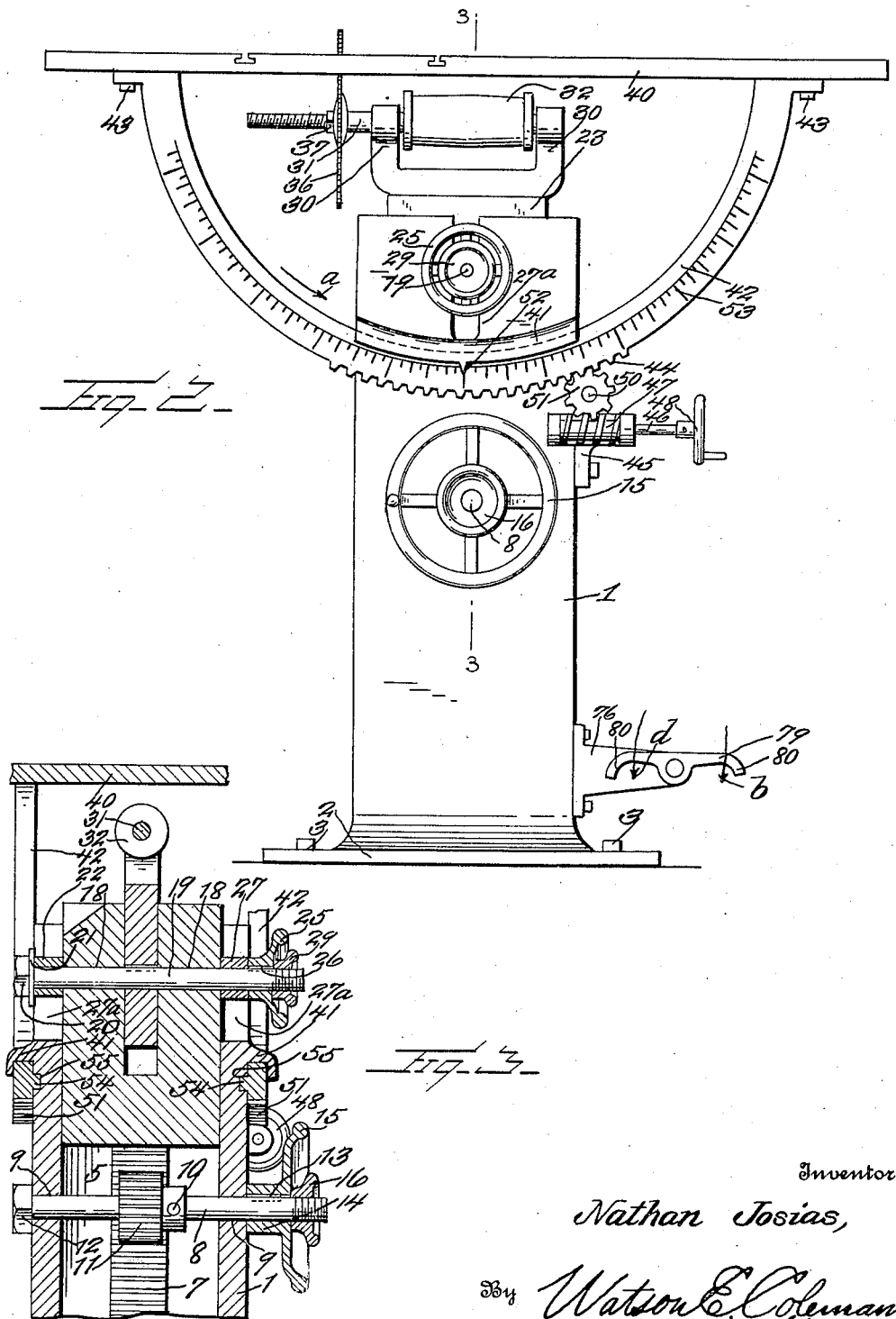

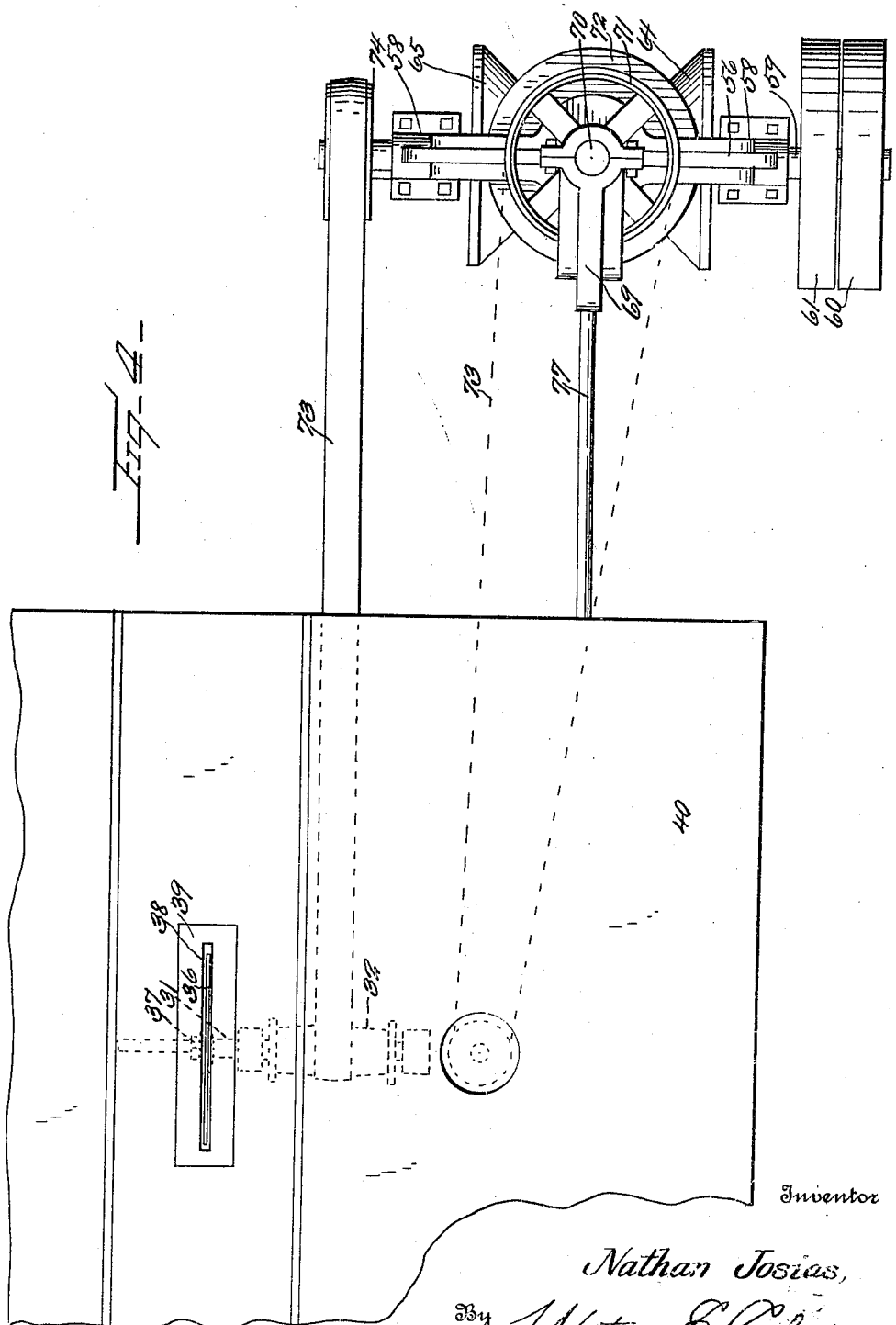

N. JOSIAS.
COMBINATION SAW TABLE AND SINGLE SPINDLE SHAPER.
APPLICATION FILED SEPT. 6, 1919.
1,327,390.
Patented Jan. 6, 1920.
4 SHEETS—SHEET 4.
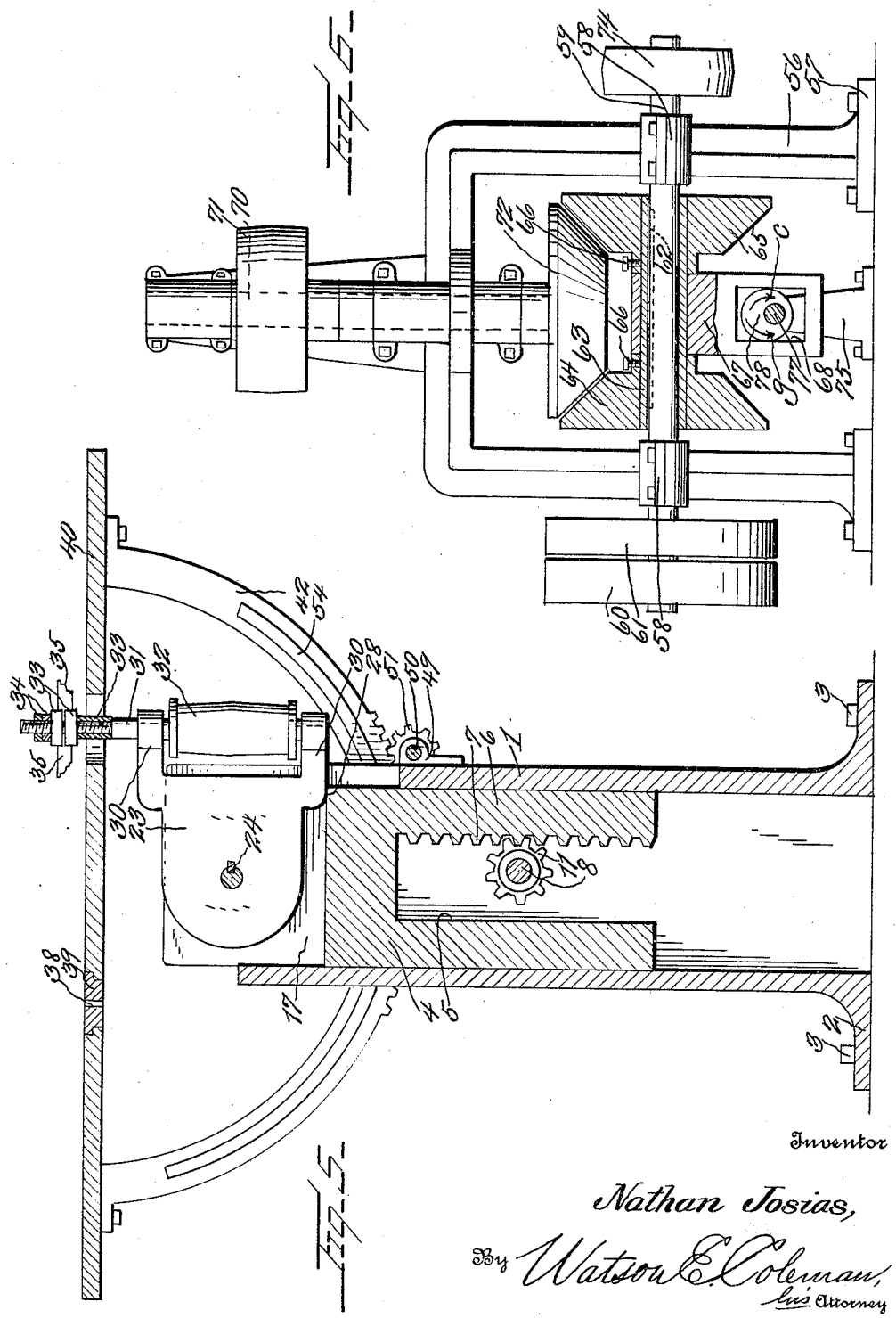
Inventor
Nathan Josias,
By Watson E. Coleman,
his Attorney

UNITED STATES PATENT OFFICE.

NATHAN JOSIAS, OF PHILADELPHIA, PENNSYLVANIA.

COMBINATION SAW-TABLE AND SINGLE-SPINDLE SHAPER.

1,327,390.   Specification of Letters Patent.   Patented Jan. 6, 1920.

Application filed September 6, 1919. Serial No. 322,208.

*To all whom it may concern:*

Be it known that I, NATHAN JOSIAS, a citizen of the United States, residing at Philadelphia, in the county of Philadelphia and State of Pennsylvania, have invented certain new and useful Improvements in Combination Saw-Tables and Single-Spindle Shapers, of which the following is a specification, reference being had to the accompanying drawings.

This invention relates to the art of wood working machines and particularly to an improved combination saw table and single spindle shaper, and as a primary object of the invention, it is the aim to provide a machine of this kind, which may be quickly converted from a saw table, to a single spindle shaper, and vice versa. When used as a saw table, various cuts in wood working or wood cutting may be accomplished. Obviously, when the saw is removed, the spindle may carry any form of cutter and disposed in a vertical plane, whereby various shapes of moldings and the like may be produced.

Another object of the invention is the provision of a machine of this kind in which the table may be easily and quickly tilted, and held in different tilted positions, whereby different angles of cuts may be formed on the wood, as it is moved over the table.

A further object of the invention is the provision of a head member carrying a spindle adapted to be driven, and which may carry either a saw or a shaping or cutting tool, and may be driven by the same means when in vertical or horizontal positions.

A still further object of the invention is the provision of means for adjusting the head member vertically, for holding the spindle in different positions, in combination with means for adjusting the head member.

The invention further aims to provide means for reversing the operation of the spindle, particularly when the spindle is rotating when disposed in a vertical plane.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of the improved combination saw table and single spindle shaper, constructed in accordance with the invention.

Fig. 2 is a view in side elevation of the combination saw table and single spindle shaper, at right angles to that shown in Fig. 1.

Fig. 3 is a vertical sectional view on line 3—3 of Fig. 2.

Fig. 4 is a top plan view of the combination saw table and single spindle shaper.

Fig. 5 is a vertical sectional view of the saw table and single spindle shaper, at right angles to that shown in Fig. 3.

Fig. 6 is a view of the driving means for the combination saw table and single spindle shaper, showing the frame in elevation, and certain friction drive gears in section, also showing the shifting means for such friction drive gears in section.

Referring more especially to the drawings, 1 designates a standard, which has a base 2 to be secured to the floor or other place, as indicated at 3. This upright or standard is hollow, and preferably rectangular in cross-section, though not necessarily. Mounted for vertical sliding movement in the upright or standard is a sliding head 4, which has its lower portions bifurcated, as shown at 5. One of the arms 6 (which are caused to be formed by the bifurcation) is provided with rack teeth 7. A shaft 8 is mounted in bearings 9 on opposite sides of the upright or standard, and secured to this shaft by means of a pin 10 is a gear 11. One end of the shaft 8 has a head 12, and feathered or splined at 13 to the opposite end of the shaft is the hub 14 of the hand wheel 15, whereby the shaft 8 may be rotated. When the shaft 8 is rotated, it is apparent that vertical movement may be imparted to the head 4, to raise or lower the same. A lock nut 16 is threaded on one end of the shaft 8 and is adapted to be rotated in clamping engagement with one face of the hand wheel 15, thereby pulling axially upon the shaft 8, drawing its head 12 tight against one face of the upright or standard, and forcing the hub of the hand wheel tight against the opposite face of the standard or upright, hence locking the shaft 8 against movement, thereby preventing displacement of the head, after it has been once adjusted.

The upper part of the head is provided with a bifurcation 17 formed at right angles to the bifurcation 5. Mounted in bearings 18 of the sides of the bifurcation is a shaft 19, one end of which has an integral head 20 and a washer 21. This washer 21 is detachable, and is interposed between the head 20 and the collar or sleeve 22, the sleeve or collar 22 being interposed between the washer and the outer face of one of the sides of the bifurcation. The body 23 of a spindle holder is feathered or splined at 24 on the shaft 19, so as to operate between the sides of the bifurcation, so as to tilt to either a vertical position or a horizontal position, or any other angular position, when the shaft 19 is rotated. A hand wheel 25 is splined at 26 on the shaft 19, whereby the shaft may be rotated in one direction or the other. A sleeve 27 is interposed between the hub of the hand wheel and one face of one of the sides of the bifurcation. By moving the hand wheel in one direction or the other, the body of the spindle holder may be tilted either to a vertical position or horizontal position, and when in a horizontal position, the holder engages the bottom of the bifurcation 17, as at 28, to insure holding the spindle holder in a horizontal position. A lock nut 29 is threaded on one end of the shaft 19 and is designed to tightly engage one face of the hand wheel, thereby drawing axially upon the shaft 19. When the shaft is pulled axially by tightening up on the lock nut 29, (which may be rotated either by hand, or by means of a spanner wrench) the various parts, such as the head 20, the sleeve or collar 22, the sleeve 27 and the hand wheel are drawn toward each other, in other words jammed frictionally together, thereby holding the shaft 19 in such adjusted positions as to hold the body of the spindle holder either vertically or horizontally.

The spindle holder is provided with projecting arms 30, in bearings of which a spindle 31 is mounted. A pulley 32 is carried by the spindle, and is positioned between the arms 30. The upper end portion of the spindle is threaded, and by means of the usual sleeves and lock nuts, such as indicated at 33 and 34, suitable wood cutting or shaping tools 35 may be held tightly on the spindle. When the spindle holder is disposed vertically, a circular saw blade 36 may be secured on the spindle by means of the clamping nut 37. This saw blade is designed to operate through the slot 38 of an insert block 39. This opening 38 may have either vertical longitudinal side walls or side walls which are arranged in parallelism, but at angles to the plane of the table top 40. In other words, when the table top is disposed at an angle to the horizontal, it is necessary to employ an insert block which has its slot 38 formed on an angle relatively to the plane of the table top, and in this case, it will be seen, that the saw will form an angular cut on the work which is operated and movable across the table.

The opposite sides of the upright or standard are provided with arcuate guides 41, in which the segment or arcuate curved members 42 are mounted. These arcuate curved members or segments 42 are disposed concentrically and in parallelism, and are secured as at 43 to the under face of the table, and are also provided with gear teeth 44. A bracket 45 is mounted on one side of the upright or standard and mounted in bearings thereof is a shaft 46 having a worm 47, and provided with a hand wheel 48. A suitable bearing 49 is secured on one side of the upright or standard, and mounted therein is a shaft 50 carrying worm pinions 51, which mesh with the teeth 44 of the arcuate curved members or segments 42. One of the worm pinions meshes with the worm 47, so that by turning the hand wheel 48, the arcuate curved members 42 may be operated in their guides, whereby the table may be tilted in different angular positions, when the segments are moved in the direction of the arrow a. Since a worm operating means is employed for operating the arcuate curved members or segments, it is unnecessary to employ other means, for holding the segments in different positions, so as to prevent movement of the table after it has been once adjusted. One of the overhanging guides 41 has a pointer or indicator 52, and one of the segments or arcuate curved members is provided with a series of graduations 53, with which the pointer or indicator coöperates, so as to indicate the angle of tilt of the table. The arcuate curved members or segments on their adjacent faces are provided with arcuate ribs 54 which engage corresponding guides 55 of the opposite faces of the upright or standard, in order to additionally guide and also support the table when being adjusted.

An operating mechanism detailed in Fig. 6 is provided for operating the spindle, whether it is in a horizontal plane, or in a vertical plane. This operating mechanism comprises a frame 56, the feet 57 of which may be mounted and secured on any suitable base as shown. Mounted in bearings 58 of opposite portions of the frame 56 is a shaft 59. Mounted upon one end of the shaft are fast and loose pulleys 60 and 61. Feathered or splined as at 62 on the shaft 59 is a sleeve 63, upon the opposite ends of which beveled friction cones or gears 64 and 65 are secured by the set screws 66. A depending arm 67 is mounted upon the sleeve 63 and intermediate the friction gears 64 and 65. The lower portion of this arm 67 has a rectangular loop 68.

The upper part of the frame 56 terminates in a yoke 69, in bearings of which a shaft 70 is mounted. This shaft 70 carries a pulley 71 near its upper portion, and its lower end carries a friction gear 72, which is interposed between the friction cones or gears 64 and 65. A coupling belt 73 is employed, and when the spindle is disposed in a vertical position, as shown in Fig. 5, this coupling belt 73 passes about the pulleys 32 and 71, as shown in dotted lines in Figs. 1 and 4. When the spindle is disposed in a horizontal position, as shown in Fig. 2, or as shown in Fig. 1, the coupling belt 73 engages the pulleys 32 and 74, as shown in full lines in Figs. 1 and 4. This pulley 74 is carried by and rotatable with the shaft 59 of the operating mechanism.

Mounted in bearings 75 and 76 is a rocking shaft 77. The bearing 75 is disposed adjacent the frame 56, that is to say, between the arms of the frame, while the bearing 76 is carried by the upright or standard 1. One end of this rocking shaft is provided with an eccentric or cam 78, which operates in the opening of the rectangular loop 68. The other end of the shaft 77 has a foot pedal 79. This foot pedal has oppositely extending arms 80. When the foot pedal 79 is disposed in the position shown in Fig. 2, the shaft 77 is positioned, so as to hold the eccentric or cam 78 neutral, that is to say, in such a position that neither one of the cone gears 64 and 65 can engage the cone gear 72. In this instance, the coupling belt 73 would be operating from the pulley 74 and the pulley 32, when the spindle is in a horizontal position. However, when the foot pedal is operated downwardly in the direction indicated by the arrow $b$, the shaft 77 will be rocked in the direction of the arrow $c$, thereby moving the friction gear or cone 64 in contact with the friction cone or gear 72, thereby imparting movement to the pulley 71 in one direction (which may be belted by the belt 73 to the spindle when in a vertical position), so as to impart movement to the spindle in a corresponding direction. When the foot pedal 79 is tilted downwardly in the direction of the arrow $d$, the shaft 77 will be rotated in the direction of the arrow $g$, which will cause the depending member 67 to shift the sleeve 63, so that the friction cone or gear 65 will frictionally contact with the friction cone or gear 72, thereby imparting movement to the pulley 71 in the opposite direction. The pulley 71 will in turn operate the spindle correspondingly in an opposite direction. It is obvious that the spindle may be easily and quickly reversed in operation, when cutting moldings, or otherwise shaping wood material used in wood construction.

When it is desired to use the spindle for carrying cutting or shaping tools, the insert block 39 is removed. A wrench is then employed to disconnect the saw blade, then the head is lowered, and the table is tilted. The spindle holder is then free to be positioned in a horizontal plane, as shown in Fig. 5, whereby the spindle may extend vertically. The table is then returned to its horizontal position, after which the head is raised, so that the spindle may project through the table. The cutter or shaping tool is then applied to the spindle, after which the machine is ready for shaping moldings or the like.

When the spindle is operated in a vertical position, a belt such as 73 engages the pulleys 32 and 71. However, when it is desired to position the spindle in a horizontal plane, the belt may be lifted off the pulley 71, after which the holder 23 may be disposed vertically, and then the belt is designed to connect the pulley 74, therefore it may be seen that the operating mechanism in Fig. 6 is adapted for operating the spindle when in a horizontal or vertical position. The frame of the operating mechanism is so constructed, that the belt 73 may be easily lifted off of the pulley 71, when it is desired to engage the belt with the pulley 74.

The invention having been set forth, what is claimed as new and useful is:

1. In a combination saw table and single spindle shaper, the combination with a hollow standard, of a head slidable therein, the lower portion of the head being bifurcated, means extending transversely of the standard having operative connections with one of the sides of the bifurcation for adjusting the head, the upper part of the head having a bifurcation at right angles to the lower bifurcation, a spindle holder pivotally mounted in the upper bifurcation, whereby it may be disposed in vertical or horizontal positions, means for securing the holder in either of said positions, a table tiltably mounted upon the upper end of the standard, and a spindle mounted in the holder and adapted to rotate when in a horizontal position under the table, or in a vertical position passing through the table.

2. In a combination saw table and single spindle shaper, the combination with a hollow standard, of a head slidable therein, the lower portion of the head being bifurcated, means extending transversely of the standard having operative connections with one of the sides of the bifurcation for adjusting the head, the upper part of the head having a bifurcation at right angles to the lower bifurcation, a spindle holder pivotally mounted in the upper bifurcation, whereby it may be disposed in vertical or horizontal positions, means for securing the holder in either of said positions, a table tiltably mounted upon the upper end of the standard, and a spindle mounted in the holder and adapted to rotate when in a horizontal position under the table or in a vertical position passing through the table, and means for operating the spindle when in either position.

3. The combination with a standard, of a spindle holder at the top thereof tiltable to present the spindle either vertical or horizontal, a table mounted above the pivot of the spindle holder and having two openings to admit respectively the spindle when vertical or a tool projecting radially therefrom when the spindle is horizontal, said table rockable about a horizontal axis, so located as to permit a tilting adjustment of the table when its openings are in operative relation to either the spindle or said tool respectively.

4. The combination with a standard, of a table pivotally mounted on the standard, a spindle holder pivotally mounted at the top of the standard below and tiltable at right angles to the axis of the table, to present the spindle either vertical or horizontal, whereby the spindle, when vertical, may operate through the table, or when the spindle is horizontal a tool projecting radially from the spindle may operate through the table, and means adapted to be operatively connected to the spindle for operating the same when in either position.

5. The combination with a standard, of a spindle holder at the top thereof, tiltable to present the spindle either vertical or horizontal, a table above the pivot of the holder and provided with openings, one to admit the spindle when vertical, the other to operatively receive a tool projecting from the spindle when it is horizontal, said table rockable about a horizontal axis at right angles to the spindle when horizontal to permit a tilting adjustment of the table relatively to the face of the tool.

6. The combination with a standard, of a spindle holder at the top thereof, tiltable to present the spindle either vertical or horizontal, a table above the pivot of the holder and provided with openings, one to admit the spindle when vertical, the other to operatively receive a tool projecting from the spindle when it is horizontal, said table rockable about a horizontal axis at right angles to the spindle when horizontal to permit a tilting adjustment of the table relatively to the face of the tool, and means adjustably carried by the standard for supporting the holder, whereby the spindle or the tool may operate through their respective openings when in relation to either of the openings.

7. The combination with a standard, of a spindle holder at the top thereof tiltable to present the spindle either vertical or horizontal, a table whose axis is above and at right angles to the pivot of the holder, whereby it may tilt in a plane at right angles to the face of a tool to be carried on the spindle when horizontal, said table having openings offset above and on either side of the pivot of the holder, one to admit the spindle when vertical, and the other to operatively receive said tool projecting radially from the spindle when horizontal, and means to be operatively connected to the spindle when in either position, for rotating the same.

8. The combination with a standard, of a spindle holder at the top thereof tiltable to present the spindle either vertical or horizontal, a table whose axis is above and at right angles to the pivot of the holder, whereby it may tilt in a plane at right angles to the face of a tool to be carried on the spindle when horizontal, said table having openings offset above and on either side of the pivot of the holder, one to admit the spindle when vertical, and the other to operatively receive said tool projecting radially from the spindle when horizontal, said table being tiltable relatively to either the spindle or said tool respectively, means operatively adjustable on the standard and carrying said holder, whereby the holder may be lowered to adjust either the spindle or the tool through its respective opening, and means to be operatively connected to the spindle when in either position, for rotating the same.

In testimony whereof I hereunto affix my signature.

NATHAN JOSIAS.